(12) United States Patent
Emery et al.

(10) Patent No.: US 6,738,414 B2
(45) Date of Patent: May 18, 2004

(54) RADIO AND COMMUNICATION METHOD USING A TRANSMITTED INTERMEDIATE FREQUENCY

(75) Inventors: David L. Emery, Charlotte, NC (US); Pierre Henri Michel Abbat, Charlotte, NC (US)

(73) Assignee: Pan Atlantic Corporation, Charlotte, NC (US)

( * ) Notice: Subject to any disclaimer, the term of this patent is extended or adjusted under 35 U.S.C. 154(b) by 0 days.

(21) Appl. No.: 09/781,875

(22) Filed: Feb. 12, 2001

(65) Prior Publication Data

US 2001/0015995 A1 Aug. 23, 2001

Related U.S. Application Data

(63) Continuation of application No. 09/033,365, filed on Mar. 2, 1998, now Pat. No. 6,188,716.

(51) Int. Cl.[7] .................................................. H04B 1/69
(52) U.S. Cl. .................... 375/147; 375/141; 375/142; 375/316
(58) Field of Search ................................ 375/295, 147, 375/141, 308, 142, 316; 455/86, 78; 370/280, 203

(56) References Cited

U.S. PATENT DOCUMENTS

| 4,599,732 A | 7/1986 | LeFever ...................... 375/13 |
| 4,630,283 A | 12/1986 | Schiff .......................... 375/1 |
| 4,683,445 A | 7/1987 | Erickson ...................... 331/25 |
| 4,696,056 A | 9/1987 | Morita ........................ 455/182 |
| 4,910,467 A | 3/1990 | Leitch ........................ 329/306 |
| 5,062,005 A | 10/1991 | Kitaura et al. ............... 358/342 |
| 5,134,707 A | 7/1992 | Sakashita et al. ............ 455/3.2 |
| 5,222,075 A | 6/1993 | Richley ......................... 375/1 |
| 5,241,562 A * | 8/1993 | Partyka et al. ............... 375/142 |

(List continued on next page.)

FOREIGN PATENT DOCUMENTS

| EP | 0526836 A | 2/1993 | ........... H04L/27/22 |
| EP | 0527481 A | 2/1993 | ............. H03J/7/06 |

OTHER PUBLICATIONS

European Search Report for counterpart foreign application No. 99300898.6.

*Primary Examiner*—Shuwang Liu
(74) *Attorney, Agent, or Firm*—Withrow & Terranova, PLLC

(57) ABSTRACT

The present invention provides a system and method for radio communications wherein the transmitted signals include an intermediate frequency in addition to a carrier frequency to aid in demodulation of data modulated on the signals and regulate the local oscillator frequency at the receiver. The invention greatly reduces the number of components required to implement a radio, and in particular, a direct sequence spread spectrum radio, reduces the frequency stability requirement at the transmitting and receiving ends of the communication, automatically tracks changes in the transmission signal after transmission, and permits the use of a single frequency reference to provide all required frequencies to operate both the receiver and the transmitter in each radio.

6 Claims, 7 Drawing Sheets

U.S. PATENT DOCUMENTS

| | | | | |
|---|---|---|---|---|
| 5,301,206 A | * | 4/1994 | Ishigaki et al. | 375/141 |
| 5,430,890 A | | 7/1995 | Vogt et al. | 455/180.3 |
| 5,438,589 A | * | 8/1995 | Nakamura | 375/145 |
| 5,444,708 A | | 8/1995 | Shimizu | 370/95.3 |
| 5,446,727 A | | 8/1995 | Bruckert et al. | 370/18 |
| 5,479,136 A | | 12/1995 | Endo et al. | 331/2 |
| 5,488,631 A | | 1/1996 | Gold et al. | 375/206 |
| 5,495,500 A | | 2/1996 | Jovanovich et al. | 375/206 |
| 5,499,267 A | | 3/1996 | Ohe et al. | 375/206 |
| 5,548,811 A | | 8/1996 | Kumagai et al. | 455/192.2 |
| 5,559,789 A | | 9/1996 | Nakano et al. | 370/18 |
| 5,640,416 A | | 6/1997 | Chalmers | 375/206 |
| 5,663,956 A | | 9/1997 | Schilling | 370/335 |
| 5,737,694 A | | 4/1998 | McMahill et al. | 455/76 |
| 5,802,067 A | | 9/1998 | Kimura et al. | 370/527 |
| 5,819,161 A | * | 10/1998 | Saito | 455/86 |
| 5,835,489 A | | 11/1998 | Moriya et al. | 370/342 |
| 6,122,326 A | * | 9/2000 | Jackson et al. | 375/308 |
| 6,188,716 B1 | * | 2/2001 | Emery et al. | 375/147 |
| 6,233,227 B1 | * | 5/2001 | Izumi | 370/280 |
| 6,421,530 B1 | * | 7/2002 | Adachi et al. | 455/86 |

* cited by examiner

RADIO AND COMMUNICATION METHOD USING A TRANSMITTED INTERMEDIATE FREQUENCY

This application is a 1.53(b) Continuation of Ser. No. 09/033,365, filed Mar. 2, 1998, U.S. Pat. No. 6,188,716 entitled RADIO AND COMMUNICATION METHOD USING A TRANSMITTED INTERMEDIATE FREQUENCY.

BACKGROUND OF THE INVENTION

The present invention relates to radio receivers and transmitters, and, more particularly, to a spread spectrum radio system in which an intermediate frequency is transmitted along with data and used at the receiver to control a local oscillator.

Radio systems using spread spectrum modulation techniques are becoming increasingly popular for a variety of communication applications. In a spread spectrum system, the transmitted signals spread over a frequency band that is wider than the minimum bandwidth required to transmit the information being sent. As a result of the signal spreading, spread spectrum systems have reduced susceptibility to interference or jamming and enable high data integrity and security. Moreover, by spreading transmission power across a broad bandwidth, power levels at any given frequency within the bandwidth are significantly reduced, thereby allowing such systems to operate outside of certain FCC licensing requirements. Given these advantages, such communication systems are becoming desirable for commercial data transmission.

A common type of such communication system is a direct sequence spread spectrum modulation system. In direct sequence spread spectrum, an RF carrier is modulated by a digital code sequence having a bit rate much higher than that of the information signal. Typically, the carrier is modulated by two data streams in quadrature. Each stream includes one phase when the data code sequence represents a logic one and a 180° phase shift when the data stream code sequence represents a logic 0. Since the digital code sequence includes square-wave half periods that vary in duration, the spectral power envelope of a direct sequence modulated signal is represented by $[(SIN\ x)/x]^2$. This quadrature modulation is commonly referred to as quadrature phase shift key (QPSK) modulation. Bi-polar phase shift key modulation may also be used.

During operation, the receiver recovers the signal using two separate processes. First, the receive signal is down converted from the center frequency ($f_c$) of the signal's carrier to a fixed intermediate frequency to enable further processing of the signal. Conventional signal processing techniques, such as those used in heterodyne radios, can be applied to down convert the received signal. Next, the spreading code modulation is removed or demodulated to reveal the information carried in the signal. Demodulating the spread signal is accomplished by multiplying the signal by a spreading code sequence identical in structure and synchronization in time with the received signal. This process is known as correlation. Down converting and demodulating the spread signal may be performed simultaneously or in successive stages.

In conventional heterodyne receivers, the received signal is mixed against a sine wave generated by a local oscillator having a frequency different from the center frequency of the carrier ($f_o$). The mixer generates sum and difference frequencies, which correspond to the originally received signal. Basically, the mixer performs a frequency conversion resulting in the received signal being converted to a replica of the received signal at an intermediate frequency (IF) comprising the difference between the carrier frequency and the local oscillator frequency ($f_c-f_o$). The information can then be demodulated at a fixed frequency in the IF stage of the receiver.

One drawback of a heterodyne receiver is that demodulation at the intermediate frequency requires additional translation mixers and tuned filters to attenuate the various noise signals that result from the heterodyne down conversion, thereby adding unnecessary complexity to the receiver circuitry. In addition, the frequency conversion process often allows undesired signals, known as the image frequency, to pass through into the IF signal processing stage. Thus, an important consideration in heterodyne receiver design is rejection of the image frequency components.

Another problem relates to heterodyne systems designed to both receive and transmit signals. To transmit a signal having the same carrier frequency of the received signal, an oscillator is required to provide the carrier frequency for the receiving and transmitting system. Since the local oscillator of the heterodyne receiver produces a frequency offset from the carrier frequency, either the local oscillator must be retuned for transmission operation or a second oscillator must be provided. Rapid retuning of the local oscillator is problematic at relatively high transaction rates, and can result in transmission delay. Also, the addition of the second oscillator further increases the complexity and cost of the radio system.

Yet another problem with such systems relates to the requirement of highly stable and precise local oscillators and related components to ensure that the local oscillator in one radio is virtually identical to the local oscillator in another radio. These systems are substantially intolerant to changes in another radio's local oscillator frequency as well as changes in the frequency after transmission due to various signal altering effects caused by the transmission environment. For example, there are many existing and proposed systems using a low-orbit satellite or network of satellites to provide communications between satellites and between satellites and ground-based stations. Examples of these systems are global pagers and telephone systems. The satellites used in these systems are preferably low-earth orbiting satellites (LEO's), which travel at a relatively high and varying speed with respect to any station or satellite with which it communicates. These relative changes in speed subject the transmission frequency to the Doppler effect.

The Doppler effect on an LEO's frequency is quite pronounced and, without a means of frequency correction, can cause severe transmission errors or a complete lack of communications ability. If an LEO is orbiting 1,000 kilometers above the earth's surface and the orbital period at the earth's surface is 155.4 minutes, the satellite would be traveling at 1,103 meters per second. If the transmission frequency of the satellite is 1 gigahertz, the measured frequency at a location on earth in the path of the satellite would vary ±37 kilohertz. If the satellite is approaching both the up-link transmitting location as well as the receiving location, the signal frequency from the LEO may change as much as ±74 kilohertz. These frequency changes do not permit the use of prior art spectrum receivers, non-spread or spread, without using complex frequency correction methods, which are expensive to employ.

Accordingly, a radio receiver and transmitter avoiding the complexity and drawbacks of heterodyne reception is needed. Furthermore, there is a need for an economical radio system capable of tracking a transmitted signal without regard to frequency changes due to phenomena, such as the Doppler effect, or drift in the receiving radio or transmitting radio's transmission frequencies.

SUMMARY OF THE INVENTION

The present invention provides a system and method for radio communications wherein the transmitted signals include an intermediate frequency in addition to a carrier frequency to aid in demodulation of data modulated on the signals and regulate the local oscillator frequency at the receiver. The invention greatly reduces the number of components required to implement a radio, and in particular, a direct sequence spread spectrum radio, reduces the frequency stability requirement at the transmitting and receiving ends of the communication, automatically tracks changes in the transmission signal after transmission, and permits the use of a single frequency reference to provide all required frequencies to operate both the receiver and the transmitter in each radio.

Accordingly, one aspect of the present invention provides a radio receiver for receiving a signal having a carrier frequency modulated by a sub-carrier frequency derived from the carrier frequency. The receiver includes a controllable frequency reference, such as a local oscillator or frequency synthesizer, adapted to provide a local oscillator frequency related to the carrier frequency of the signal to be received. Frequency scaler circuitry associated with the frequency reference is provided and adapted to derive an intermediate frequency from the local oscillator frequency wherein the intermediate frequency being related to the sub-carrier frequency. Mixing circuitry is also provided and adapted to demodulate the received signal using the local oscillator frequency down to the sub-carrier frequency. Signal comparison circuitry is adapted to compare the intermediate frequency derived from the local oscillator frequency with the sub-carrier frequency to provide a control signal to the controllable frequency reference proportional to the difference between the intermediate frequency and the sub-carrier frequency. The controllable frequency reference is adapted to regulate the local oscillator frequency according to the control signal to lock on the carrier frequency and the received signal. Any derivative of the intermediate frequency and any function of the sub-carrier frequency may be compared to regulate the local oscillator frequency.

The signal processing circuitry may include a multiplication section providing a multiplication output being a multiple of the sub-carrier frequency and related to the derived intermediate frequency. The comparison circuitry acts to compare the multiplication output of the first division output to provide a control signal for the controllable frequency reference. In spread spectrum embodiments, the receiver may include a pseudo-noise generator clocked by a function of the local oscillator frequency and adapted to provide a spreading code with a chip rate derived from the local oscillator frequency.

Yet another aspect of the present invention provides a radio for receiving signals having a carrier frequency and an intermediate frequency sub-carrier for controlling a local frequency reference. The radio includes a frequency reference providing a local oscillator frequency related to a carrier frequency of the received signal; means for demodulating a received signal into an intermediate frequency sub-carrier using the local oscillator frequency; and means for regulating the local oscillator frequency to lock on the carrier frequency as a function of the intermediate frequency sub-carrier.

Still another aspect of the present invention provides a method of radio communication using a transmitted intermediate frequency. The method includes the steps of a) transmitting a signal modulated by a sub-carrier frequency derived from a carrier frequency; b) demodulating the signal using a local oscillator frequency related to the carrier frequency; c) retrieving the sub-carrier from the demodulated signal; and d) regulating the frequency reference as a function of the intermediate frequency sub-carrier from the demodulated signal.

Yet another aspect of the present invention provides a radio comprising a receiver for receiving transmitted signals including a carrier modulated by a sub-carrier proportional to the carrier. The receiver includes demodulating circuitry for retrieving the sub-carrier using a local frequency related to the carrier frequency and regulating circuitry for controlling the local frequency as a function of the retrieved sub-carrier. The radio may further include processing circuitry for deriving a local intermediate frequency from the local frequency wherein the local intermediate frequency is related to the sub-carrier. The regulating circuitry compares a function of the local intermediate frequency with a function and sub-carrier to provide an output controlling the local frequency as a function of the retrieved sub-carrier.

These and other aspects of the present invention will become apparent to those skilled in the art after reading the following description of the preferred embodiments when considered with the drawings.

DESCRIPTION OF THE PREFERRED EMBODIMENTS

Figure 1:
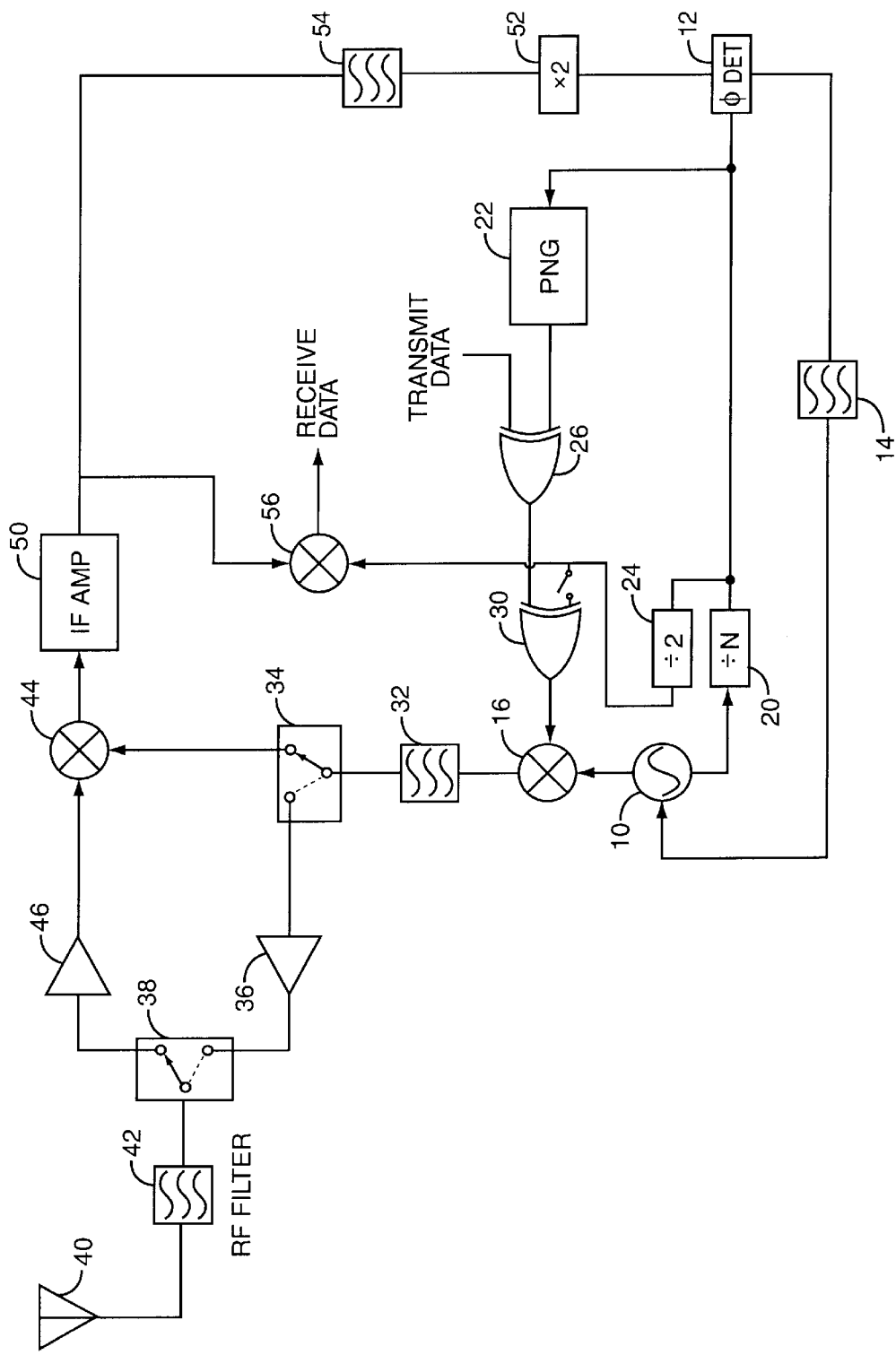
FIG. 1 is a schematic representation of a first transmitter and receiver constructed according to the present invention.

In the following description, like reference characters designate like or corresponding parts throughout the several figures. It should be understood that the illustrations are for the purpose of describing preferred embodiments of the invention and are not intended to limit the invention thereto.

Referring now to the drawings in general, and FIG. 1 in particular, a transceiver for transmitting and receiving signals, including an intermediate frequency, is depicted. The radio transceiver includes a frequency reference 10 which provides a local oscillator frequency from which all transmitting and receiving functions are controlled. Preferably, the frequency reference 10 is an oscillator including a coupled resonator surface acoustic wave (SAW)

filter. The frequency reference 10 is connected to a variable phase shift detection circuit 12, which provides an output through filter 14 regulating the frequency of the local oscillator. The frequency reference 10 is connected to a first port of a double balanced mixer 16. The frequency reference 10 is also connected to a high-frequency digital divider or pre-scaler circuit 20, which preferably divides the local oscillator frequency by N to produce a digital clock having a frequency RF/N. This frequency is used to clock a pseudo-noise generator 22. The output of the pre-scaler circuit 20 is also connected to another divider circuit 24 to provide a frequency (RF/N)/M. Preferably, the pre-scaler circuit F is a divide-by-two circuit (m=2), which provides a frequency of (RF/N)/2, which is half of the pseudo-noise generator clock frequency.

The output of the pseudo-noise generator 22 is supplied to one input of a first exclusive-or gate 26. The other input of the exclusive-or gate 26 receives data to be transmitted. Thus, the data is phase modulating the pseudo-noise code provided by the pseudo-noise generator by causing inversions of the code for logic ones. The output of the exclusive-or gate 26 is provided to a first input of a second exclusive-or gate 30. The second input of this gate is provided with the output of the divide-by-two pre-scaler circuit 24, or (RF/N)/2, which will be referred to as the intermediate frequency (IF). The output of the second exclusive-or gate 30 is connected to the second port of the double balanced mixer 16 and includes a combination of data, pseudo-noise codes and the intermediate frequency.

Mixer 16 further modulates the data, pseudo-noise codes and intermediate frequency with the local oscillator frequency wherein the output of the mixer 16 is filtered by a filter circuit 32 to remove unwanted high-frequency components of the signal. The output of the filter 32 is connected to an electronic switch 34, whose first output is connected to a power amplifier 36, which raises the power of the signal to the required power level to be transmitted. The output of the amplifier 36 is connected to a transmit/receive switch 38 to provide a connection to antenna 40 through a front-end filter 42, when the transmit mode is selected. Thus, during transmission, switches 34, 38 operate to provide a signal path from mixer 16 and filter 32 to power amplifier 36, front-end filter 42 and the antenna 40.

The transmitter section of the depicted radio forms a transmit signal containing a pseudo-noise code, which is phase modulated with data, which is further modulated by an intermediate frequency, in this case a half-code frequency clock. The resultant complex signal is then used to modulate the local oscillator frequency, representing the RF carrier. The transmitted signal is thus spread over a wide bandwidth for spread spectrum communications.

To receive a signal, the output of the divider or pre-scaler circuit 24 is inhibited to the exclusive-or gate 30, thus preventing the intermediate frequency from being mixed with the pseudo-noise codes generated from the pseudo-noise generator 22 and provided to mixer 16. The output of the second exclusive-or gate 30 will preferably include only the pseudo-noise codes from the pseudo-noise generator 22, and the output of mixer 16 will basically include the pseudo-noise codes modulated by the local oscillator frequency from the frequency reference 10.

In order to properly route a received signal, the electronic switch 34 is moved to its second position (shown) to disconnect the power amplifier 36 and connect the output of filter 32 to a first port of a receive mixer 44. The second port of the mixer 44 is connected to the output of a receive preamplifier 46, which is connected to the transmit/receive switch 38, which connects the preamplifier 46 to the antenna 40 through the front-end filter 42. During receiving, the transmit/receive switch 38 will be moved into the second position (shown).

The receive signal is initially filtered by the front-end filter 42 and amplified by the preamplifier 46 before being sent to the second port of a receive mixer 44. As noted, the receive signal is mixed with a signal from filter 32, which includes the pseudo-noise codes modulated by the local oscillator frequency. When the pseudo-noise codes in the transmitted signal and the receiver align, the received signal is de-spread and demodulated to produce an intermediate frequency, which was inserted at the transmitter, and the modulated data. The correlation circuit is not shown but in practice would be a slip-sync circuit where extra clock pulses are added or deleted to move the code phase until lock is achieved. These correlation circuits are well known and should require no further discussion for those skilled in the art. Notably, even without the correlation circuit, the difference in transmit to receive frequency would eventually cause the codes to align.

Because of the phase inversions caused by modulating the pseudo-noise code with the data, the intermediate frequency subcarrier is now phase modulated with the data at the output of the receive mixer 44. The carrier is precisely the same as would be present in a system using a different frequency for the local oscillator. However, this carrier was received using the same frequency as the transmitter and is the result of a direct conversion receiver. The primary cause for this carrier not to be identical in the frequency to the intermediate frequency is that a difference in frequency exists between the transmitter's oscillator and the receiver's oscillator.

The output of the receive mixer 44 is provided to a tuned amplifier 50, which in practice is a standard IF amplifier. The intermediate frequency in this embodiment is half the pseudo-noise clock frequency, but is not restricted to this as other frequencies can be used. The output of the IF amplifier is a carrier with transmitted data when the transmitter and receivers codes correlate.

This carrier is input to another pre-scaler circuit 52 after being filtered by a filter 54. Preferably, the pre-scaler circuit 52 is a frequency doubler and provides an output equal to the intermediate frequency multiplied by two or RF/N. The output of the frequency doubler pre-scaler circuit 52 is provided to one input of the voltage variable phase shift detector circuit 12. The second input of circuit 12 receives the pseudo-noise generators clock frequency provided by the pre-scaler circuit 20. Thus, both inputs of the detector circuit 12 will be identical when both the transmitter's and receiver's oscillators are operating at identical frequencies.

The output of the phase/frequency detector circuit 12 is a voltage or other output related in both amplitude and polarity to the frequency difference of a receiver's oscillator to the transmitter's oscillator. This signal is used as an error correcting signal to tune the receiver's frequency reference until there is no error, and the intermediate frequency subcarrier, or function thereof derived from the receive signal is identical to the intermediate frequency, or function thereof derived from the frequency reference of the receiver. Once there is no error and the receiver locks onto the receive signal, all of the circuits of the receiver are, in effect, coherent to the distant transmitter or an environmentally modified transmission signal. The receiver will follow the transmitted signal using the transmitted intermediate frequency even if the signal drifts and will maintain lock once the pseudo-noise codes are in phase.

In order to retrieve the transmitted data, the output of the IF amplifier 50 is also connected to a first port of a phase demodulator or mixer 56. A second input of the mixer 56 is connected to the output of the divide-by-two pre-scaler circuit 24, which provides the intermediate frequency generated at the receiver. Once lock is achieved, the mixer 56 is receiving an intermediate frequency modulated with data from the receive signal and an identical intermediate frequency derived from the local oscillator frequency in order to provide a stable clock to demodulate the phase modulation and recover the data.

The present invention, although most useful when used as an inexpensive direct sequence spread spectrum system, is not limited to this mode of operation. Removal of the pseudo-noise generators from the system provides a coherent narrow-band communication system. Such systems take advantage of carrier coherency and are less prone to interfering signals, as the receiver cannot lock to them. A dual-mode transceiver can be created using simple switching of the pseudo-noise generator to inhibit its operation. Additionally, a separate transmitter and receiver of either or both modes can be realized if a transceiver is not required.

It is possible to modify this embodiment to use amplitude shift keying by replacing the exclusive—or gates 26 and 30 with a single-balance mixer, whose inputs are the intermediate frequency and the data, followed by a double-balance mixer whose other input is the pseudo-noise code. The mixer 56 may remain the same or can be replaced with a simple diode to separate the data from the modulated signal.

Also, the invention is not limited to using a SAW oscillator. The frequency reference may be a voltage controlled or other oscillator, which, when divided, would be locked to a quartz crystal by a phase detector. The crystal could then be tuned by a varactor diode by the phase/frequency detector's error voltage to maintain coherency. It should be obvious to those skilled in the art that many modifications are possible using the methods taught herein. Certain of these modifications are disclosed below.

Quadrature Phase Shift Keying with Intermediate Frequency on One Carrier

In one such embodiment, quadrature phase shift keying (QPSK) is accomplished by placing the intermediate frequency on either the in-phase or quadrature carrier. Quadrature phase shift keying uses four phases of a carrier to encode data. The carrier is generated in phase and in quadrature, wherein data is encoded on both carriers. Subsequently, the two carriers are added.

Figure 2:
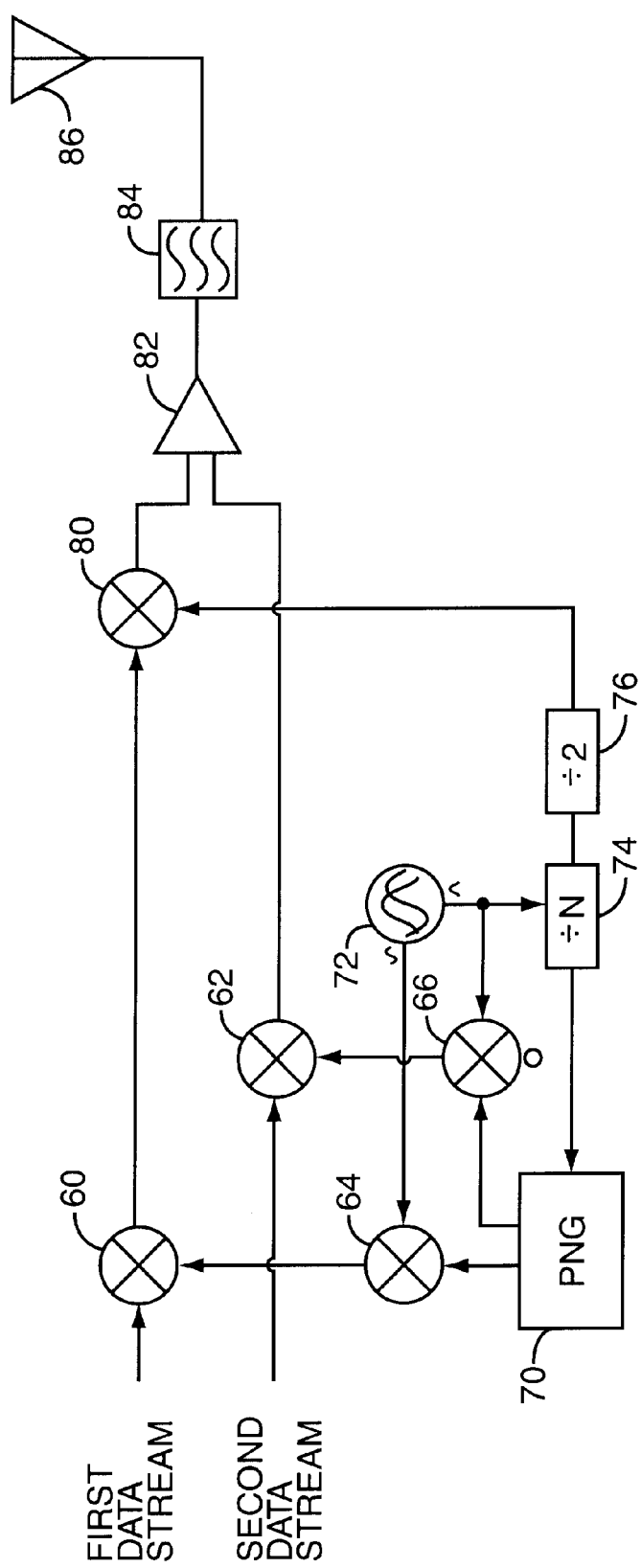
FIG. 2 is a schematic representation of a second transmitter embodiment constructed according to the present invention.
Figure 3:
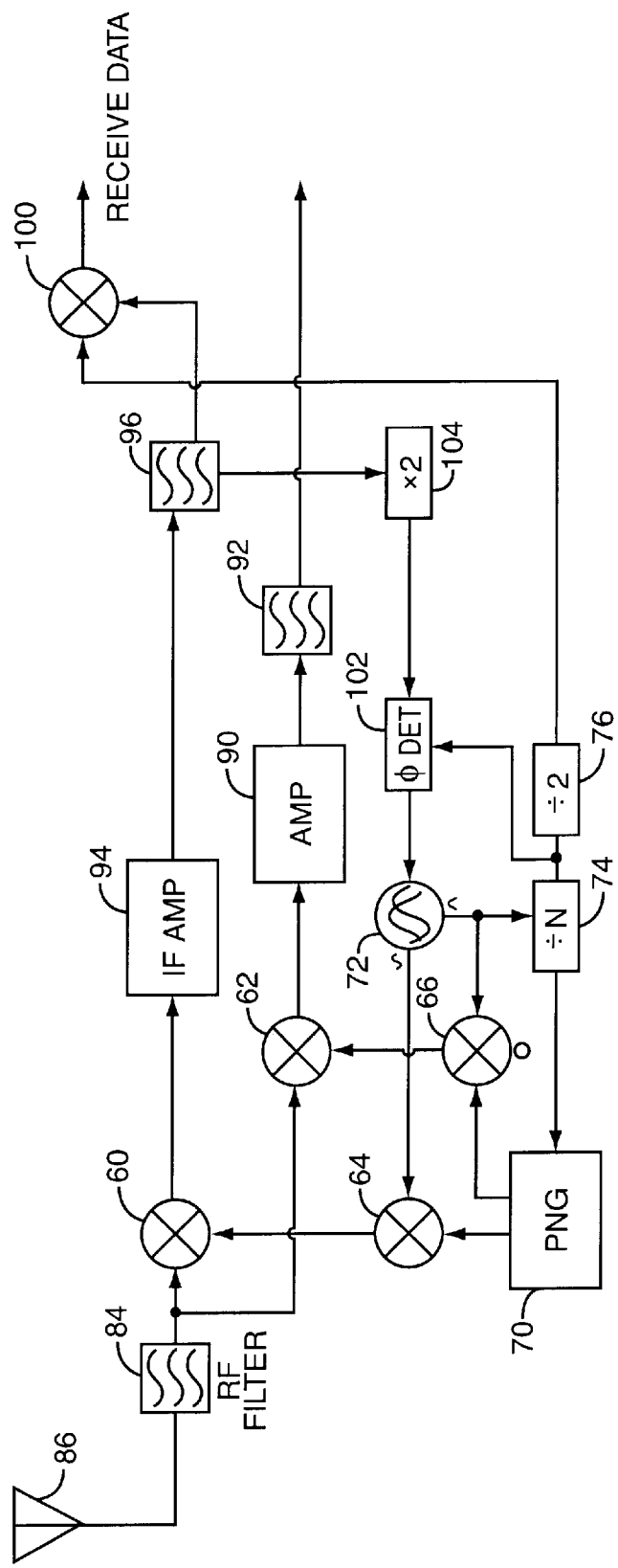
FIG. 3 is a schematic representation of a receiver compatible with the transmitter of FIG. 2.

In the embodiment depicted in FIGS. 2 and 3, the intermediate frequency is applied to the in-phase carrier but not the quadrature carrier. Two spreading codes are applied to the in-phase and quadrature carriers. The codes may be the same code delayed by one or more chips, preferably more than one, or there may be two different codes having the same length. Applying the intermediate frequency to one carrier, but not the other, prevents the problem of the receiver interpreting the in-phase carrier as the quadrature-phase carrier, and vice versa. This technique is useful for transmitting two separate signals, which do or do not have the same bit rate. The technique can also be used to transmit stereo audio, using CVSD modulation or other digital code, including PCM, wherein the intermediate frequency can be used to keep track of the left and right signals. Generally, one's ears do not care if the sound is upside down, but they do care if the left ear gets the right ear's signal.

With reference to FIG. 2, two data streams enter the left side of the transmitter and are mixed with a spread local oscillator frequency in mixers 60 and 62, respectively. The spread local oscillator frequency is generated from mixers 64 and 66, where two phases of the local oscillator frequency are mixed with two spreading codes generated from the pseudo-noise generator 70. The sine signal indicates the in-phase and the cosine symbol indicates the quadrature signal. The output of the frequency reference or oscillator 72 is divided by pre-scaler circuitry 74 to produce a clock frequency for the pseudo-noise generator 70, and is further divided by additional pre-scaler circuitry 76 to produce the intermediate frequency. The intermediate frequency is mixed in mixer 80 with the in-phase subcarrier, but not the quadrature carrier. The in-phase and quadrature carriers are added in summing circuitry 82, filtered by front-end filter 84 to remove spurs, and transmitted through antenna 86. Notably, the intermediate frequency is formed from the quadrature phase in the embodiment shown; however, either phase component may be used and mixed on to either phase of the respective carrier.

A complementary receiver for the transmitter as shown in FIG. 2 is depicted in FIG. 3. The receive signal is picked up on antenna 86 and filtered through the front-end filter 84. The receive signal is sent to mixer 60 for demodulating the in-phase carrier and to mixer 62 for demodulating the quadrature carrier. For demodulating the in-phase carrier, the local oscillator frequency is spread at mixer 64 using a corresponding pseudo-noise code from the pseudo-noise generator 70. The output of mixer 64 is applied to mixer 60 to provide an in-phase, narrow-band carrier containing the intermediate frequency.

Similarly, the quadrature carrier is demodulated using a spread, in-phase local oscillator frequency provided by mixer 66. The output of mixer 62 is the quadrature, narrow-band carrier. The in-phase, narrow-band carrier does not include the intermediate frequency and is amplified at amplifier 90, filtered by filter 92 and output directly to a data processing circuitry (not shown).

The in-phase, narrow-band carrier output by mixer 60 is amplified by an IF amplifier 94 and filtered by filter 96. The in-phase, narrow-band carrier output of filter 96 includes the intermediate frequency and is provided to mixer 100 in order to demodulate the intermediate frequency and output the data carried by the in-phase carrier. In order to demodulate the quadrature, narrow-band carrier, the mixer 100 must also receive a locally generated intermediate frequency. In this embodiment, the locally generated intermediate frequency is derived from the quadrature phase of the frequency reference 72 by dividing the local oscillator frequency by N with pre-scaler circuitry 74, and further dividing that signal by 2 using additional pre-scaler circuitry 76. The output of pre-scaler circuitry 76 is provided to the mixer 100 to demodulate, and, thus, remove the intermediate frequency from the in-phase, narrow-band carrier in order to provide the quadrature data.

In order to allow the frequency reference 72 to generate a local oscillator frequency identical to the respective carrier frequencies received, the frequency reference 72 is provided an error signal from a frequency/phase detection circuit 102, which compares the received intermediate frequency or a function thereof with the locally generated intermediate frequency or a function thereof. In the embodiment shown, the output of filter 96 is the in-phase, narrow-band carrier having the transmitted intermediate frequency. This output is sent to pre-scaler circuitry 104, which, preferably, multiplies the signal by 2 and provides the resulting received signal, RF/N, to one input of the frequency/phase detection circuitry 102. The other input of the frequency/phase detection circuitry 102 receives the output of the pre-scaler circuit 74, which is a frequency RF/N. The latter being derived from the local frequency reference wherein the former is derived from the transmitted signal. The frequency/phase detection circuitry 102 provides an output regulating the local frequency reference 72 until lock is achieved, wherein the intermediate frequencies and the respective carrier frequencies of the transmitted signal and those generated at the receiver match. Furthermore, the output of the pre-scaler 74 is used clock the pseudo-noise generator 70 to provide a clock signal and a frequency twice the intermediate frequency.

Thus, the embodiment of FIGS. 2 and 3 modulates an intermediate frequency derived from the quadrature phase of the local oscillator frequency onto the in-phase carrier. The receiver will use the intermediate frequency to control the local oscillator frequency to lock on the receive signal and provide both quadrature and in-phase data accordingly.

Figure 4:
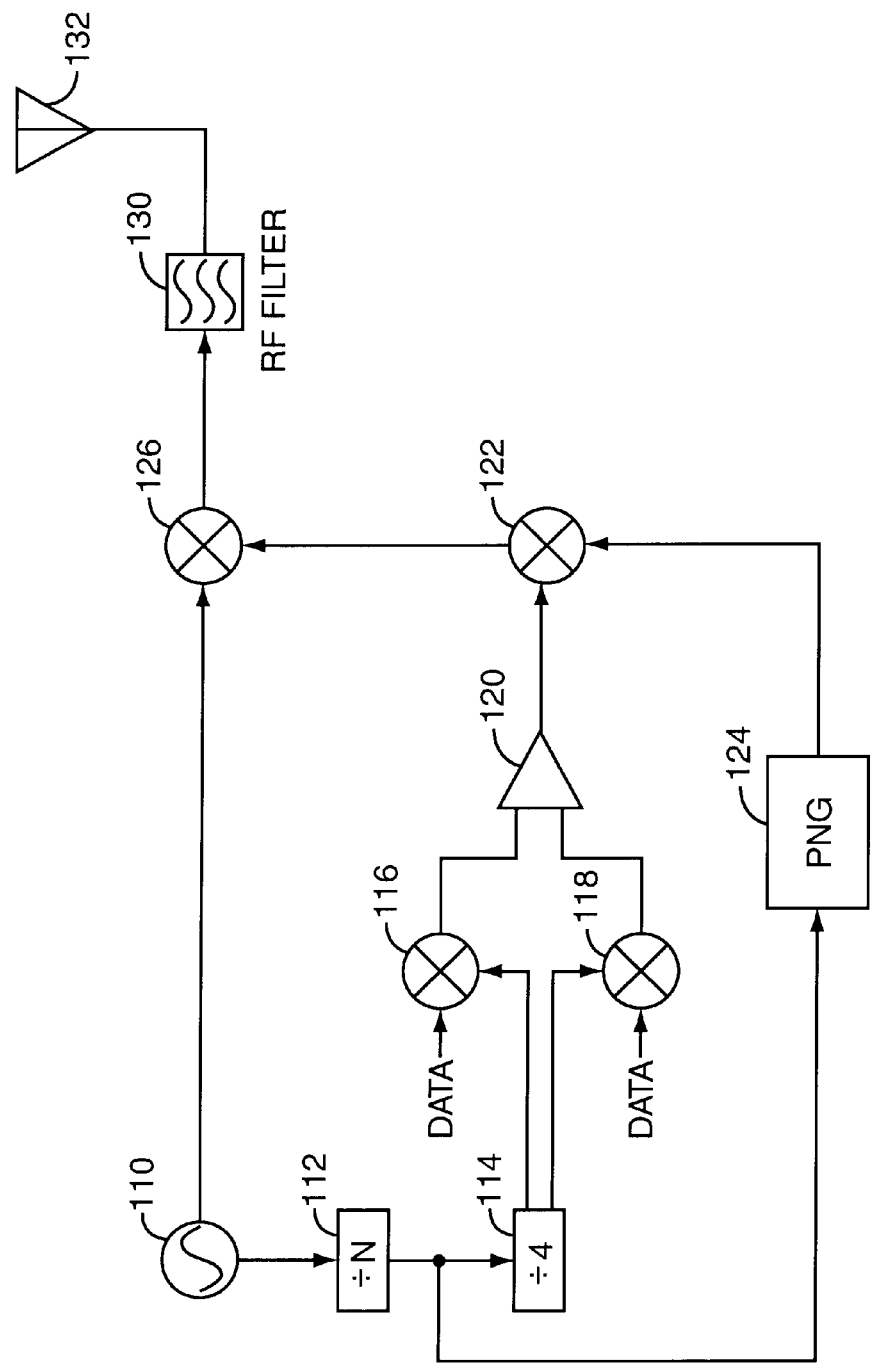
FIG. 4 is a schematic representation of a third transmitter embodiment constructed according to the present invention.
Figure 5:
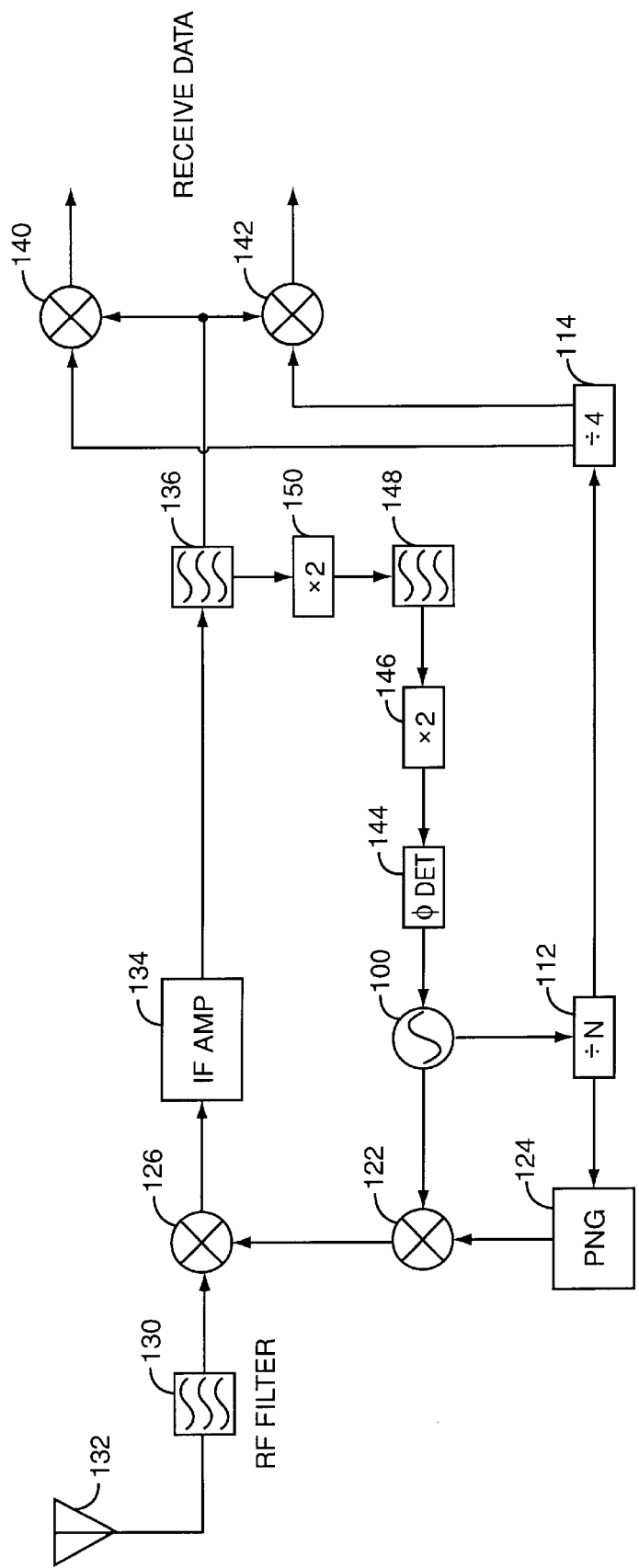
FIG. 5 is a receiver embodiment compatible with the transmitter of FIG. 4.

Quadrature Phase Shift Keying with Intermediate Frequency Modulator on Both the In-Phase and Quadrature Carriers The transmitter of FIG. 4 and the receiver of FIG. 5 cooperate to transmit and receive signals wherein the in-phase and quadrature carriers are modulated by an intermediate frequency. The frequency reference 110 provides a local oscillator frequency. The local oscillator frequency is divided by N using pre-scaler circuitry 112 and sent to a quadrature driver 114 which produces two signals in quadrature, an in-phase signal and a quadrature signal. Circuitry 114 may also include or be associated with additional pre-scaler circuitry adapted to divide local oscillator frequency, or both of the quadrature signals, by four (or any other number). The output of the quadrature driver circuitry 114 includes a quadrature intermediate frequency $(RF/N)_Q/4$ or $RF/4N_Q$ and an in-phase signal $(RF/N)_I/4$ or $RF/4N_I$. These signals are sent to mixers 116 and 118, respectively, to modulate two data streams. The outputs of these mixers represent the quadrature and in-phase intermediate frequencies modulated by the data.

These signals are summed at summing circuitry 120 wherein the output is sent to mixer 122. The output of the pre-scaler circuitry 112 (RF/N) is also used to clock the pseudo-noise generator 124 to provide an output of pseudo-noise codes to mixer 122. Accordingly, mixer 122 spreads the summed intermediate frequency signals received from the summing circuitry 122 and provides an output to mixer 126. Mixer 126 modulates the summed, intermediate frequency and data signals by the local oscillator frequency for transmission. Preferably, this signal is amplified and filtered using an amplifier (not shown) and filter circuitry 130 and antenna 132.

Attention is now drawn to FIG. 5. In order to receive quadrature phase shift keyed signals having an intermediate frequency subcarrier on both the in-phase and quadrature carriers, the composite signal is received through antenna 132 and filtered at filter 130. The signal is then mixed with the spread local oscillator provided by mixer 122 and amplified at the intermediate frequency amplifier 134. The spread local oscillator frequency is provided by mixing the local oscillator frequency from the frequency reference 100 and the pseudo-noise code generated by the pseudo-noise generator 124. The signal from the intermediate frequency amplifier 134 is a sine wave in any of the four quadrature phases, depending on the two bits encoded in the two carriers.

In order to use the intermediate frequency for synchronizing the oscillator's local oscillating frequency with that of the carrier of the received signal, the signal from amplifier 134 is filtered using filter 136 to remove noise and multiplied by two using scaler circuitry 150, filtered again by filter 148, and scaled by a factor of two using pre-scaler circuitry 146. At this point, the signal from the amplifier 134 is quadrupled and provided to the frequency/phase detecting circuitry 144. The signal at this input is represented by RF/N, a function of the intermediate frequency derived from the received signal. Pre-scaler circuitry 112 acts to divide the local oscillator frequency by N and provides a local function of the intermediate frequency (RF/N) to the other input of the frequency/phase detector circuitry 144.

Comparing a function of the intermediate frequency derived from the received signal and a locally derived function of the intermediate frequency provides an output to control the frequency reference 100 and lock the local oscillator frequency with that of the received carrier frequency. In operation, filter 136 removes noise, pre-scaler circuitry 150 doubles the frequency, filter 148 removes extraneous harmonics, and pre-scaler circuitry 146 doubles the frequency and produces a fourth harmonic, which is used by the frequency/phase detector circuitry 144 to lock on the received signal.

Additionally, the local oscillator frequency from the frequency reference 100 is divided by N at the pre-scaler circuitry 112 to produce a chip clock for clocking the pseudo-noise generator 124 which generates the spreading code. As noted, the spreading code is mixed with the local oscillator frequency at mixer 122 to produce the spread local oscillator, which is used to initially de-spread the received signal. The output of the pre-scaler 112 is also fed to the quadrature driver and/or pre-scaler circuitry 114 to provide two output signals in quadrature.

A common way to design circuitry 114 is to use two D flip-flops, with the Q of the first flip-flop connected to the input of the second flip-flop, and the /Q of the second flip-flop connected to the input of the first flip-flop. The Q output of each of the flip-flops represents the two outputs of circuitry 114. These outputs are sent to mixers 140 and 142, respectively. Each mixer 140, 142 receives the despread transmitted signal, which basically includes the two quadrature modulated intermediate frequencies and data. Mixer 140 demodulates the in-phase signal while mixer 142 demodulates the quadrature data, wherein the outputs of the mixers provide the originally modulated data, two bits at a time.

Unlike the second embodiment discussed above, the signal may be received in any phase, so the data are encoded as phase changes rather than absolute phases. This technique is used for quadrature amplitude modulation as well as QPSK.

Notably, modulation schemes with more than two bits per symbol may be reduced to QPSK by providing multi-level signals on the in-phase and quadrature data lines. For instance, one scheme may transmit four bits per symbol by using four levels on both the in-phase and quadrature.

Figure 6:
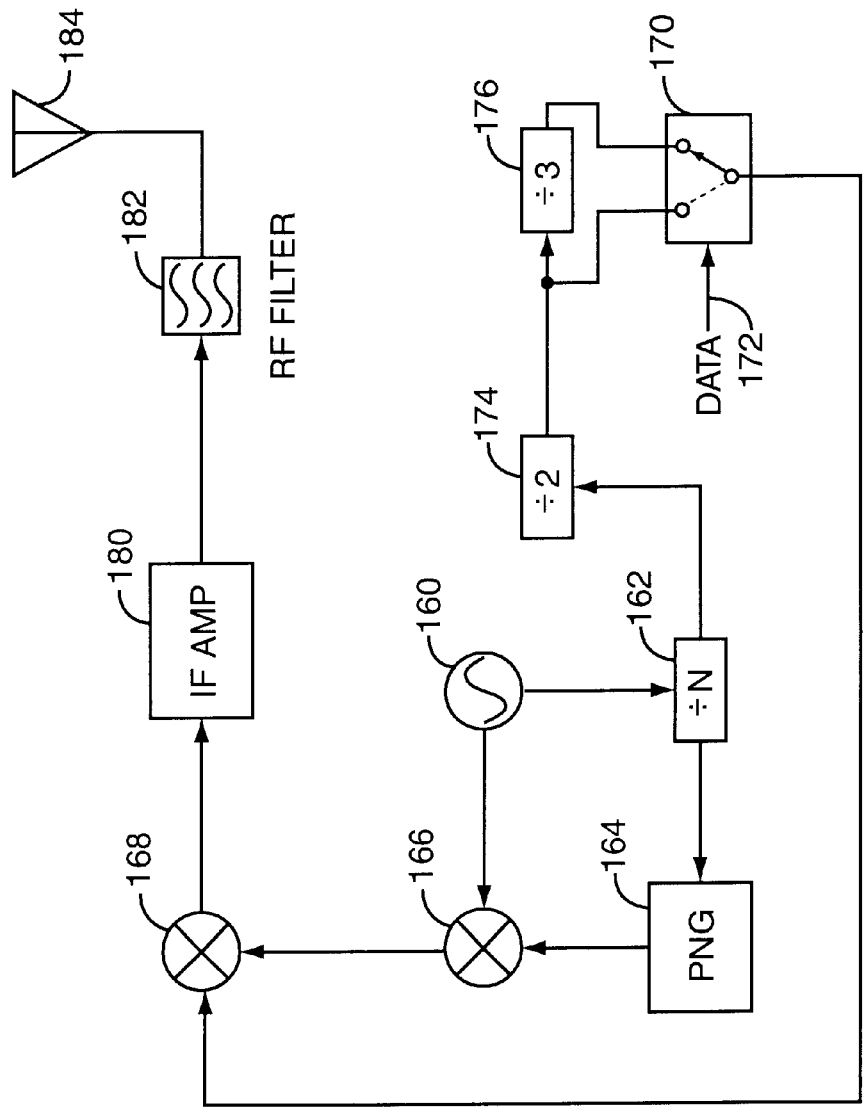
FIG. 6 is a schematic representation of a fourth transmitter embodiment constructed according to the present invention.
Figure 7:
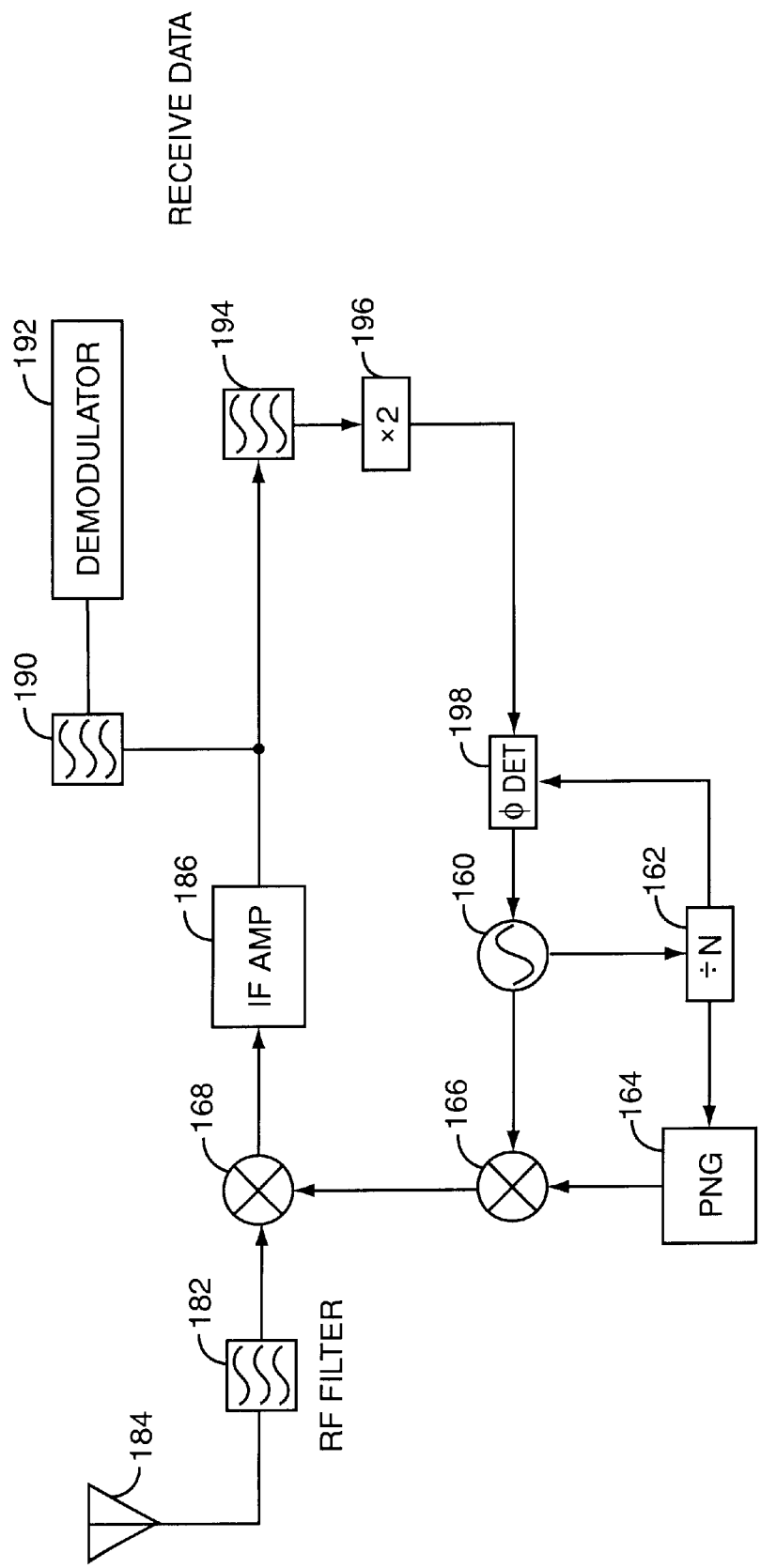
FIG. 7 is a schematic representation of a receiver compatible with the transmitter of FIG. 6.

Frequency Shift Keying Using a Transmitted Intermediate Frequency to Regulate the Local Oscillator Yet another embodiment of the present invention provides for using a transmitted intermediate frequency to control the local oscillator in a frequency shift keyed embodiment. In the past, frequency modulation of an entire signal did not appear to be practical, because it requires synchronizing a high frequency local oscillator to a carrier which is varying in frequency while having access to periodic cycles (for example, every 128 cycles). Frequency shift keying on the intermediate frequency, where the two frequencies are rationally related, has been found to be practical. FIGS. 6 and 7 depict an embodiment in which one of the keying frequencies is three times the other, so that the other frequency or a harmonic thereof is always present and can be used to synchronize the local oscillator.

The frequency reference 160 provides a local oscillator frequency which is divided by N using pre-scaler circuitry 162 to generate a signal represented by RF/N. This signal is used to clock a pseudo-noise generator 164, which provides spreading codes to mixer 166. Mixer 166 also receives the local oscillator frequency from the frequency reference 160 in order to provide a spread local oscillator output to mixer 168, which operates to modulate frequency shift keyed data received from the FSK circuitry 170. The FSK circuitry 170 selects one of two frequency sources as an input based on a data input 172.

These frequency sources are derived from the local oscillator frequency. Preferably, the local oscillator frequency is divided by N using the pre-scaler circuitry 162 and further divided by 2 using pre-scaler circuitry 174 to provide a first keyed frequency, $F_k$, to the FSK circuitry 170. The output of the divide-by-2 pre-scaler circuitry 174 is also provided to additional pre-scaler circuitry 176 operating to divide the frequency FSK by 3 to provide a second key frequency $F_k/3$. The FSK circuitry 170 selects $F_k$ or $F_k/3$ according to the data received at the data input 172. The output of the FK circuitry 170 is provided to mixer 168 where it is modulated by the spread local oscillator frequency, amplified by amplifier 180, filtered by filter 182 and transmitted via antenna 184. A compatible receiver for receiving the frequency shift keyed signals is shown in FIG. 7. The signal is picked up on antenna 184, filtered at filter 182 and ultimately sent to mixer 168 for demodulating the received signal with the spread local oscillator frequency from mixer 166. The mixer 166 receives the local oscillator frequency from the frequency reference 160 and spreading codes from the pseudo-noise generator 164. Preferably, the pseudo-noise generator 164 is clocked by the local oscillator frequency divided by N using the pre-scaler circuitry 162.

After being demodulated by the spread local oscillator frequency, the receive signal is sent to an intermediate frequency amplifier 186 and on to two different filters 190 and 194. The signal sent to filter 194 is processed and used to regulate the receiver's local oscillator to provide frequency lock. The output of filter 194 is multiplied by two by the pre-scaler circuitry 196 and sent to the phase/frequency detecting circuitry 198. This function of the intermediate frequency (IF times 2 or $^{RF}/_N$) is compared with a related frequency derived from the local oscillator frequency by dividing the local oscillator frequency by N using the pre-scaler circuitry 162. The output of the frequency/phase detecting circuitry 198 controls the local oscillator frequency 160 as discussed above.

Notably, filter 198 is designed to pass frequencies at ⅓ the frequency of filter 194 and is used to demodulate the frequency shift keyed data. The two keyed frequencies are in such phase that the third harmonic of the lower frequency ($F_k$ times 3) is in phase with the higher frequency $F_k$; thus, the phase is not flipped in the output of filter 194. The demodulator 192 detects the lower frequency $F_k/3$ to provide a data output. Additionally, the output of filter 194 may be followed by a comparator and similar demodulators in order to compare the information demodulated by the demodulator 192 and received after filter 194.

It is possible to achieve higher data rates by using codes in which cycles of $F_k/3$ are interspersed with the cycles of $F_k$, without the phase of $F_k/3$ being kept constant. There are three phases of $F_k/3$ which can be used this way without affecting the synchronization. Thus, two bits can be encoded per symbol, the fourth symbol being $F_k$. Another way to increase the data rate during FSK modulation is to flip the phase, as in the first embodiment. Notably, $F_k$ represents the intermediate frequency in this embodiment wherein $F_k$ or IF is the local oscillator frequency divided by N divided by 2 ((RF/N)/2).

In any of the above embodiments, please note that the phase/frequency detecting circuitry can be any means for comparing the transmitted and locally derived intermediate frequencies or functions thereof. Any means for using the intermediate frequency received in the transmitted signal may be used to control a frequency or voltage controlled local oscillator, synthesizer or the like. Furthermore, the intermediate frequency or any function or derivative of the intermediate frequency can be used to control the local oscillator frequency. Such a function may include linear and non-linear functions. Furthermore, a function of the intermediate frequency is defined herein to include the intermediate frequency wherein $F_{IF}(x)=X_{IF}$, and the claims are to be construed accordingly. As one of ordinary skill in the art will recognize, the transmitted intermediate frequency can be used directly to control the local oscillator frequency or derived and processed in any number of ways to control the local oscillator. In cases where a receiver and a transmitter are provided in the same radio, the intermediate frequency is preferably manipulated to avoid overloading the receiver when the transmitter is modulating the carrier with a intermediate frequency sub-carrier.

Certain other modifications and improvements will occur to those skilled in the art upon reading the foregoing description. For example, mixing circuitry may include exclusive-or gates as well as traditional analog and digital mixers. It should be understood that all such modifications and improvements have been deleted herein for the sake of conciseness and readability, but are properly within the scope of the following claims.

What is claimed is:

1. A method of radio communications using a transmitted intermediate frequency comprising:

a. transmitting a signal modulated by a subcarrier frequency derived from a carrier frequency;

b. demodulating the signal using a local oscillator frequency related to the carrier frequency;

c. retrieving the subcarrier from the demodulated signal; and d. regulating the local oscillator frequency as a function of the subcarrier from the demodulated signal, wherein the regulating step includes comparing a function of the local oscillator frequency with a function of the intermediate frequency subcarrier from the demodulated signal.

2. The method of claim 1 wherein the transmitted signal is spread using a spreading code and further comprising generating the spreading code at a rate derived from the local oscillator frequency.

3. A radio comprising:
a receive for receiving transmitted signals including a carrier modulated by a subcarrier proportional to the carrier, said receiver including:
   i) demodulating circuitry for retrieving the subcarrier using a local frequency related to the carrier frequency;
   ii) regulating circuitry for controlling the local frequency as a function of the retrieved subcarrier; and
   iii) processing circuitry for deriving a local intermediate frequency from the local frequency;
   wherein the local intermediate frequency is related to the subcarrier and the regulating circuitry compares a function of the local intermediate frequency with a function of the subcarrier to provide an output controlling the local frequency as a function of the retrieved subcarrier.

4. The radio of claim 3 further comprising a transmitter for transmitting signals including a carrier modulated by a local subcarrier proportional to the carrier, said local subcarrier being derived from the local frequency.

5. The radio of claim 4 wherein the local frequency provides the carrier for signals transmitted from the transmitter.

6. A radio for communications using a transmitted intermediate frequency comprising:
   a. means for transmitting a signal modulated by a subcarrier frequency derived from a carrier frequency;
   b. means for demodulating the signal using a local oscillator frequency related to the carrier frequency;
   c. means for retrieving the subcarrier from the demodulated signal; and
   d. means for regulating the local oscillator frequency as a function of the subcarrier from the demodulated signal, wherein the means for regulating includes a means for comparing a function of the local oscillator frequency with a function of the intermediate frequency subcarrier from the demodulated signal.

* * * * *